United States Patent Office 3,496,061
Patented Feb. 17, 1970

3,496,061
FLEXIBLE PACKAGES CONTAINING NONFUSIBLE HIGH PEEL STRENGTH HEAT SEALS
Oren A. Freshour, Westport, Conn., and Fred B. Shaw, Hinsdale, Ill., assignors to Continental Can Company, Inc., New York, N.Y., a corporation of New York
No Drawing. Filed Jan. 28, 1966, Ser. No. 523,529
Int. Cl. B32b 27/08; B65d 5/42
U.S. Cl. 161—254                                                  8 Claims

ABSTRACT OF THE DISCLOSURE

Flexible packages are prepared from plies of at least two polyolefin films prepared from different olefin compositions, one of the films being comprised of olefin homopolymers, olefin copolymers and blends thereof, and the other of the films being comprised of olefin copolymers and blends of the copolymers with olefin homopolymers. Packages prepared from laminating these films have heat seals separable at the original interface of the films, with peel strengths exceeding 400 grams per inch of seal width.

---

This invention is directed to the preparation of flexible packages and more specifically to the preparation of packages from various plies of fusible materials normally used in packaging various articles of commerce. More particularly, this invention is directed to the preparation of flexible packages from plies of at least two different plastic films and laminations thereof, each of which comprises at least one polyolefin. These packages have non-fusible heat-seals with peel strengths in excess of approximately 400 grams per inch and may be further characterized as capable of being separated along the original interface without destroying the package outside of the seal area. The seals are prepared by utilizing sealing temperatures in excess of about 250° F.

The polyolefin films or sheets of materials used in preparing the flexible packages of this invention may be characterized as normally fusible films inherently plasticized, substantially insoluble in water and most aliphatic hydrocarbons. These films are prepared from olefin homopolymers, copolymers or polymeric blends containing at least one olefin including, for example, polymers of ethylene, propylene, butylene, etc.

In recent years, various plastic film materials and their use in the packaging industry have rapidly increased, particularly in producing packages for such articles including food products, meats, machine parts, clothing and a number of other similar items. Presently, various plastic films, coated paper, coated foils and laminations thereof are being used by the packaging industry in preparing these flexible packages, such as bags, pouches, overwraps and the like. These packages are normally joined at a selected surface by means of adhesives, heat-sealing, pressure-sealing, and occasionally by stitching. Techniques similar to these are also being employed in fabricating web materials utilized in other industries concerned with manufacturing clothing, clothing accessories, toys, automotive parts, etc. There are, however, a variety of heat-sealing and pressure-sealing techniques and various adhesives which are being used as a means of forming these packages.

Thus, for purposes of this invention, these terms and their use herein may be defined as follows: By adhesive bonding, it is implied that the introduction of a third mutually adherent material is used between the surfaces to be joined at or approximately at the same time and place that the joint is to be prepared. On the other hand, by heat-sealing, it is implied that due to the fusible nature of the material used in the fabrication of the package, e.g., polyethylene, or because of the fusible nature of the coating being applied to the basic material, frequently at a time and place different from the fabrication process, the two surfaces to be joined are united by utilizing a combination of heat and pressure.

Similarly, pressure-sealing might also be considered as a special type of heat-sealing wherein normal room temperatures are sufficient to activate the cross-sealing of two coated surfaces when placed in contact with one another under a sufficient pressure. The self-sealing envelopes, etc. are well known and a good example of pressure-sealing. A full discussion and further analysis of these techniques, including impulse heat-sealing, dielectric sealing and ultrasonic-sealing, may be found in standard texts, such as "Heat Sealing" by R. D. Farkas, published by the Reinhold Publishing Company (1964). It is sufficient for purposes of this invention to include any of the techniques normally used in elevating the temperature at the joining interface, whether the technique involves driving heat through the full thickness of one or both webs, from one or more outside sources, or by inducing the generation of heat within the webs or portions thereof. For uniformity purposes, however, the following descriptions and examples are directed to resistance thermo-heat-sealing unless specifically indicated otherwise.

The strength of the seal obtained per unit area by most of the known techniques is a function of several factors, the primary of which obviously includes the nature of the materials being united, the temperature at the interface of the materials, the pressure applied to the materials, and the dwell time or period of time during which the assembled materials are exposed to the elevated temperatures and pressures. Thus, in order to study the strength of any particular seal obtained with any given combination of plastic materials, it is customary to prepare a heat-seal curve. This is obtained by sealing together the two web materials at selected temperature intervals, with each seal being prepared under constant pressure and dwell time conditions. These curves usually develop the minimum temperature at which a particular material has a tendency to form a seal to a maximum temperature at which said materials significantly distort or decompose. Various sample seals are prepared at 25° F. intervals between these two limits with a fixed pressure, i.e., 40 p.s.i., and a fixed dwell time normally about one-half second. Each test specimen is evaluated in a tensile testing machine comprising one leg of the specimen in a fixed jaw of said machine with the other leg in a movable jaw. These jaws are separated at a constant rate normally at about 20 inches per minute and the force required to cause the seal to peel apart or to rupture is recorded in grams per inch of seal width.

When these seal specimens are tested in the described manner, the specimens may fail or come apart in a number of different ways. For example, the seal may separate along the original interface and is referred to hereinafter as a Type-A seal. Alternatively, the seal may separate because of cohesive failure in one of the sealing plies and is referred to hereinafter as a Type-B seal. In addition, the seal may break or tear outside of the seal area due to the strength of the seal which exceeds the tensile strength of at least one of the two materials employed and is referred to hereinafter as a Type-C seal. Still further, the seal may break or tear outside of the seal area due to the initial failure of the bond between the sealing ply and the facing components of a laminate, followed by a tensile failure of the sealing ply. This, of course, occurs when the strength of the seal is greater than either the ply bond strength and the tensile strength of the sealing ply, and is referred to hereinafter as a Type-D seal.

If an attempt is made to open a series of flexible packages prepared from materials characterized by seals which tend to fail in each of the ways indicated above, it would be immediately observed, provided some unsealed material from both of the webs has been allowed to extend beyond the seal area, that structures which incorporate either the Type-A or Type-B seal may be opened with virtually no damage to the parent material and that the opened package may continue to be used as a container. On the other hand, however, packages containing seals of the Type-C or Type-D would be almost impossible to open so as to result in a package which could be used as a container. In these types of seals, attempts to separate the bond would result in damage to the packages to the extent that most of the packages would lose their utility as a container. In fact, in most instances the only satisfactory means by which a package of this type can efficiently be opened would be either by means of a tool, i.e., scissors, or through the use of tear strings or notches, neither of which reliably provide for straight line openings. Thus, in all four of the above-mentioned type seals, if all of said seals were equally strong, equally capable of supporting heavy loads, equally resistant to abusive handling, and equally capable of holding up under difficult environments, there is no doubt that the Type-A and Type-B seals would be employed almost exclusively. This, however, is not the case and by presently available commercial materials and techniques, Type-A and Type-B seals are substantially weaker than the Type-C and Type-D seals.

Accordingly, it has been discovered that heat-seals of certain polyolefin films or films prepared from compositions containing a polyolefin can be obtained which over a wide temperature range have characteritsics of the Type-A and Type-B seals, while having strengths exemplified by the Type-C and Type-D seals.

Thus, it is an object of this invention to provide flexible packages prepared from normally fusible plies of at least two different polyolefins or polyolefin-containing films and laminations thereof which have at least one heat-seal with a peel strength in excess of approximately 400 grams per inch.

It is another object of this invention to provide a method of preparing flexible packages comprising fusible plies of at least two different polyolefins or polyolefins-containing films and laminations thereof prepared by sealing said films at a temperature in excess of about 250° F. to obtain a seal with peel strengths in excess of approximately 400 grams per inch of seal width.

It is still another object of this invention to provide films prepared from olefin homopolymers, copolymers and polymeric blends containing at least one olefin which may be used in preparing flexible packages with heat-seals having peel strengths in excess of approximately 400 grams per inch of seal width.

It is still another object of this invention to provide a number of polyolefin films prepared from homopolymers, copolymers and polymeric blends containing at least one polyolefin which may be used to prepare flexible packages containing at least one heat-seal having a peel strength in excess of approximately 400 grams per inch of seal width.

It is still a further object of this invention to provide a flexible package containing heat-seals wherein said package is prepared from laminates of different polyolefin films on various web materials, including, for example, plastic materials, paper, metallic foil and the like.

These and other objects of the invention will become apparent from a further and more detailed description of the invention to follow.

It has been discovered that flexible packages comprising fusible plies of at least two different untreated polyolefins or polyolefin-containing films and laminations thereof can be prepared with at least one heat-seal with peel strengths in excess of approximately 400 grams per inch of seal width. These seals are prepared by utilizing temperatures in excess of about 250° F. and more preferably in excess of about 275° F. By utilizing specific pairs of untreated polyolefins or polyolefin-containing films, it is possible to obtain packages with heat-seals having characteristics defined at Type-A or Type-B seals with peel strengths normally obtained from seals characterized as Type-C and Type-D.

It has been found that substantially high strength seals with Type-A characteristics can be obtained over a wide range of sealing conditions when both of the sealing plies comprise at least one polyolefin. This is intended to include homopolymers, copolymers and polymeric mixtures of olefins. However, if the difference between the two polyolefin-comprising sealing plies is too great, only relatively weak seals can be obtained over a rather narrow temperature range and, therefore, these combinations are not suitable for purposes of this invention. On the other hand, if the difference between the two sealing plies are not sufficient, the seals will fuse under high temperature conditions and, therefore, cannot be relied on under all conditions to yield a Type-A seal. Thus, it has been found that only certain polyolefin-comprising films may be used in preparing the nonfusible heat-seals having peel strengths in excess of approximately 400 grams per inch. To accomplish the heat-seals of this invention, it was necessary to use at least two films which differ primarily in composition but at the same time are sufficiently similar so as to yield seals having high peel strengths and at the same time are non-fusible seals.

Combinations of normally fusible plies which may be used for purposes of this invention include, for example, at least two different films comprising at least one polyolefin. The polyolefin-comprising films or pairs of films used to prepare the seal may be characterized as being internally plasticized due to the inherent nature of the polymeric compositions and are essentially insoluble in water and aliphatic hydrocarbons, such as esters, ketones or the like. These olefin-comprising polymeric films are capable of yielding seals with peel strengths in excess of 400 grams per inch of seal width over a wide range of conditions and are cross-sealable under a variety of temperature, pressure and dwell time conditions. In addition, the pairs of polyolefin-comprising films used in preparing the heat-seals of this invention may be characterized as being essentially homogeneous throughout and free of any lacquers, emulsions or other coating compositions. Thus, the following polyolefin-comprising films indicate the various materials that may be used in pairs to prepare the high strength seals in accordance with this invention.

The following polyolefin-comprising films are examples of the different pairs of materials which may be used to form heat-seals having peel strengths of at least 400 grams per inch of seal width when prepared at temperatures in excess of about 250° F. Each of the films used to make the seals must comprise at least one polyolefin, such as polypropylene, polyethylene, polyisobutylene, etc. It is obvious, however, that in preparing the seals, the temperature used may vary depending upon the pressure and the dwell times. There is, of course, an infinite number of different combinations of temperature, dwell times and pressure, but it has been found that everything else being equal, weaker seals are obtained either by reducing the pressure or the dwell time. The latter, however, is more significant than the pressure because the dwell time determines the amount of heat applied to the exterior surface of any particular structure. Thus, for example, to obtain the same seal strength at 20 p.s.i. with a ¼ second dwell time as would be obtained at 40 p.s.i. with a ½ second dwell time, it would be necessary to increase the sealing temperature by 25° to 50°. The exact amount of increase in temperature will be determined, however, not only by the thermoconductivity of the material being used but also by the thickness of the laminates involved. It is possible, for purposes of this invention, by utilizing specified olefin-comprising films to obtain peelable-seals having peel strengths in excess of approximately 400 grams per inch of seal width by utilizing sealing temperatures in excess of about 250° F., e.g., 275° F. to 475° F., and by varying the sealing pressures from about 5 p.s.i. to 100 p.s.i. with various dwell times, e.g., periods ranging from about ⅛ of a second to about several seconds.

an alpha-olefin with an ethylenically unsaturated monocarboxylic acid such as acrylic or methacrylic acid wherein at least 10% of said carboxylic acid groups are neutralized by an alkali metal ion.

TABLE I

| Laminate pair | 300° F. | 325° F. | 350° F. | 375° F. | 400° F. | 425° F. | 450° F. | 475° F. |
|---|---|---|---|---|---|---|---|---|
| O |  | 150 | 450 | 1,100 | 1,670 | 1,510 | 1,460 | 1,880 |
| P |  | 120 | 430 | 840 | 1,310 | 1,410 | 1,760 | 1,420 |
| Q |  |  | 117 | 210 | 520 | 600 | 520 | 490 |
| R |  |  |  | 180 | 1,350 | 1,330 | 1,090 | 1,200 |
| S |  |  | 100 | 310 | 1,620 | 990 | 970 | 970 |
| T |  | 100 | 340 | 1,400 | 1,400 | 1,600 |  |  |
| U |  | 80 | 200 | 700 | 1,700 | 1,600 |  |  |
| V | 473 | 440 | 473 | 900 | 683 | 723 | 480 |  |
| W | 416 | 446 | 1,433 | 1,383 | 1,333 | 1,416 | 1,366 | 700 |
| X | 736 | 413 | 1,086 | 1,193 | 1,086 | 1,140 | 1,233 |  |

The heat-seal curves of the above laminated pairs were obtained at 40 p.s.i. with ½ second dwell times. The peel strength values are given in grams per inch of width of the seals. The laminated pairs may be further characterized as follows:

Laminated pair "O" is a film of polypropylene heat-sealed to a film comprising a blend of polyisobutylene and an ethylene-butene copolymer. The blend is prepared from preblended pellets having a density of about 0.94 and a melt index of approximately 0.2. The ethylene-butene copolymer is present in the blend in an amount ranging from about 70–90% with the polyisobutylene being present in an amount ranging from about 10–30%. The laminated pair "P" comprises a film of polypropylene heat-sealed to a film prepared from a bled comprising an ethylene-butene copolymer, polyisobutylene and low density polyethylene. The blend consists primarily of 80–90% of the ethylene-butene copolymer and polyisobutylene and 10–20% of the low density polyethylene. The polyethy'ene has a density of about 0.922 and a melt index of about 1.2.

The laminated pair "Q" is a film prepared from an ethylene-butene copolymer heat-sealed to a film prepared from a blend comprising polypropylene and an ethylene-propylene copolymer. The blend of propylene and ethylene-propylene copoloymer comprises 75–85% of polypropylene and 15–25% of the ethylene-propylene copolymer. The laminated pair "R" comprises a film prepared from a bled of an ethylene-butene copolymer and polyisobutylene heat-sealed to a film prepared from a blend of polypropylene and an ethylene-propylene copolymer.

The laminated pair "S" is a film prepared from a blend of an ethylene-butene copolymer, polyisobutylene and a low density polyethylene heat-sealed to a film prepared from a blend comprising an ethylene-propylene copolymer and polypropylene.

The laminated pair "T" comprises a film prepared from an ethylene-propylene copolymer heat-sealed to a film prepared from the blend comprising an ethylene-butene copolymer and polyisobutylene. The ethylene-propylene copolymer is characterized as having a density of approximately 0.905 and a nominal flow rate of about 2.5. The laminated pair "U" comprises a film prepared from an ethylene-propylene copolymer heat-sealed to a film prepared from a blend comprising an ethylene-butene copolymer, polyisobutylene and a low density polyethylene.

The laminated pair "V" is a film of low density polyethylene heat-sealed to an ionomer resin. The low density polyethylene may be characterized as having a density of about 0.922 and a melt index of about 1.2. The ionomer resin may be characterized as a metal-containing ionic copolymer obtained by the reaction between ethylene or an alpha-olefin with an ethylenically unsaturated monocarboxylic acid such as acrylic or methacrylic acid wherein at least 10% of said carboxylic acid groups are neutralized by an alkali metal ion.

In preparing these ionic copolymers, the olefin ranges from about 80 to 99 mole percent with the unsaturated monocarboxylic acid ranging from about 1 to 20% and more preferably from about 1 to 10 mole percent. The olefin or ethylene, for example, and more specifically the alpha-olefin, may be characterized by the general formula $RCH=CH_2$, wherein R is either hydrogen or a radical selected from the group consisting of alkyl radicals having from 1 to 8 carbon atoms per molecule. This includes, for example, ethylene and olefin monomers such as propylene, butene-1, pentene-1, heptene-1, hexene-1, 3-methyl butene-1, 4-methyl pentene-1, octene-1, etc. The olefins are copolymerized with an unsaturated monocarboxylic acid such as acrylic or methacrylic acid wherein the acid may range up to about 20 mole percent and more preferably in an amount ranging from about 1 to 10 mole percent. The base copolymers are converted to ionic copolymers by reacting said copolymer with an ionizable alkali metal compound. This reaction or neutralization with the alkali metal ion is sufficient to at least neutralize 10% of the carboxylic acid groups and more preferably 35–80% of the acid groups. A typical example of preparing an ionic copolymer comprises milling approximately a 500 gram sample of an ethylene-methylacrylic acid copolymer containing about 10 mole percent by weight of methacrylic acid to the mill temperature and then adding thereto about 24 grams of sodium methoxide, dissolved in about 100 mls. of methanol. The sodium methoxide is added to the copolymer over a period of about five minutes and the copolymer is worked on the mill. Blending of the composition is continued for approximately 15 minutes, during which time the initially soft, fluid-melt becomes stiff and rubbery. An ionomer resin may be characterized as having a melt index of about 1.2 and a density of 0.938.

The laminated pair "W" comprises a film prepared from medium density polyethylene heat-sealed to an ionomer resin. The medium density polyethylene is characterized as having a density of about 0.928 and a melt index of about 1.8.

The laminated pair "X" is prepared from films of ethylene-vinylacetate copolymers heat-sealed to an ionomer resin. The copolymer of ethylene and vinylacetate is characterized as having a density of about 0.926 and a melt index of about 1.5.

In comparison to the seals obtained from the above pairs, presently known packaging materials capable of yielding Type-A or B seals provide the peeling characteristic at the expense of seal strength and, therefore, packages produced therefrom are limited with respect to their load-carrying capacity. Typical heat-seal curves for these materials are illustrated in Table II. The heat-seal strengths are in terms of grams per inch at 40 p.s.i. with a ½ second dwell time.

TABLE II

|  | Saran coated cellophane | Nitrocellulose coated cellophane | Foil x wax tissue [1] | Polymer blended wax coated glassine [2] |
| --- | --- | --- | --- | --- |
| 150° F | No seal | No seal | 13 | 300 |
| 175° F | No seal | No seal | 70 | 340 |
| 200° F | No seal | No seal | 147 | 340 |
| 225° F | No seal | No seal | 153 | 350 |
| 250° F | 75 | 100 | 166 | 370 |
| 275° F | 166 | 110 | 186 | 380 |
| 300° F | 175 | 135 |  | 400 |
| 325° F | 211 | 140 |  | 390 |
| 350° F | 248 | 140 |  | 380 |

[1] Seals by microcrystalline-paraffin wax blend "striking through" the porous tissue.
[2] Elvax (low molecular weight ethylene-vinylacetate polymer)-paraffin wax-terpene resin blend coated glassine.

Other packaging materials, such as polyethylene, rubber hydrochloride (Pliofilm) and vinylchloroacetate films and laminated structures utilizing these polymers, are capable of producing Type-A seals under certain conditions. It was found, however, that as the sealing temperature increased and/or the dwell time increased, the contacting surfaces completely fused or welded and no trace of the original interface remained. Thus, a Type-C or Type-D seal resulted which is a fused seal and, therefore, cannot be opened without destroying the package. Typical heat-seal curves for these materials may be illustrated in the following table. The heat-seal strengths are given in terms of grams per inch at 40 p.s.i. with ½ second dwell times:

TABLE III

|  | 300° F. | 325° F. | 350° F. | 375° F. |
| --- | --- | --- | --- | --- |
| Low Density Polyethylene | [1] 1,100 | [1] 1,200 | [1] 1,200 | [1] 1,200 |
| Plasticized Vinyl (Vinylchloracetate) | [1] 1,800 | [1] 2,100 | [1] 2,100 | [1] 2,200 |
| Rubber Hydrochloride (Pliofilm) | [1] 1,600 | [1] 1,600 | [1] 1,600 | [1] 1,600 |
| Polyester (Mylar) x Saran x Polyethylene | [1] 5,600 | [1] 5,200 | [1] 5,200 | [1] 5,500 |
| Polyester (Mylar) x Saran x Polyethylene | [1] 2,185 | [1] 2,465 | [1] 4,175 | [1] 4,800 |
| Polyester (Mylar) x Saran x Polyethylene | 1,275 | [1] 4,580 | [1] 4,800 | [1] 4,800 |

[1] Indicates fused, non-peelable seal.

The peelable seal, though widely used, may be characterized as nothing more than a weak seal with a minimum of beading. This type of seal, however, is useful in packaging since it permits the film to be welded together and at the same time to be separated at the interface without tearing the package or without requiring the use of a tool, i.e., scissors, to open the package. This type of seal is obtained in accordance with this invention by regulating the amount of temperature and pressure and dwell time applied.

By utilizing the polyolefin films or films comprising at least one polyolefin in accordance with this invention, it is possible to obtain Type-A and B seals on commercial production machinery without having to have a close control of the temperature, pressure and dwell times. With the present production machinery, it is commercially impossible to adjust the equipment so that it would always result in a Type-A seal with a structure which has a capability of providing fused seals. Thus, it has been found that most frequently the product or seal obtained falls into a class which is considered an inadequate seal or into an area of the fused seals which thus makes it impractical to rely on a process requiring closely controlled operation of the machinery. Nevertheless, seals of the Type-A and B are highly desirable by most of the commercial manufacturers of flexible packaging and particularly to manufacturers concerned with packaging sterile pharmaceutical and surgical items required to be used under operating room conditions. There is a critical need for means of preparing a sterile package which can be opened without contamination. Presently, many complicated and cumbersome methods of obtaining this goal have been proposed but have not been completely satisfactory since most of them are primarily based on the use of controlled production machinery or some other highly difficult controlled production condition.

While this invention has been described with respect to a number of specific embodiments, it is obvious that there are other modifications and variations which can be resorted to without departing from the true spirit of the invention, excluding, however, those modifications which are not particularly pointed out in the appended claims.

What is claimed is:

1. A flexible package fabricated from plies of at least two polyolefin films prepared from different olefin compositions, one of said films being selected from the group consisting of olefin homopolymers, copolymers and blends thereof, and the other of said films being selected from the group consisting of olefin copolymers and blends of copolymers with olefin homopolymers, the polyolefin films of different olefin compositions being heat sealed with the faces of the different films in contact to form the package, the resultant package having at least one heat seal separable at the original interface of the films with a peel strength in excess of approximately 400 grams per inch of seal width, said heat seals prepared at sealing temperatures in the range of about 275° to 475° F.

2. The flexible package of claim 1 further characterized in that the seal is prepared at a pressure of about 5 to 100 p.s.i. and at a dwell time ranging up to about several seconds.

3. The flexible package of claim 1 further characterized in that the plies comprising said package consist of laminates of said films on web materials selected from the group consisting of thermoplastic films, paper, metallic foil and combinations thereof.

4. The flexible package of claim 1 further characterized in that the heat seal is prepared from films of polypropylene sealed to films of a polymeric blend comprising polyisobutylene and an ethylene-butene copolymer.

5. The flexible package of claim 1 further characterized in that the heat seal is prepared from films of polypropylene sealed to films prepared from a polymeric blend comprising an ethylene-butene copolymer, polyisobutylene and a low density polyethylene.

6. The flexible package of claim 1 further characterized in that the heat seal is prepared from films of an ethylene-propylene copolymer sealed to films prepared from a polymeric blend comprising a copolymer of ethylene-butene and polyisobutylene.

7. The flexible package of claim 1 further characterized in that the heat seal is prepared from films of polyethylene heat-sealed to films prepared from an ionic copolymer obtained by the reaction of ethylene and an ethylenically unsaturated monocarboxylic acid wherein at least 10% of the carboxylic acid groups are neutralized with an alkali metal ion.

8. The flexible package of claim 1 wherein one film is prepared from a polyolefin selected from the group consisting of polyethylene, polypropylene, ethylene-propylene copolymers, ethylene/vinyl acetate copolymers, and blends thereof, and a second film is prepared from a polyolefin selected from the group consisting of ethylene-butene copolymers, ionic copolymers obtained by the reaction of ethylene and an ethylenically unsaturated monocarboxylic acid wherein at least 10% of the carboxylic acid groups are neutralized with an alkali metal ion and blends of ethylene-butene copolymers with polyisobutylene, polyethylene and mixtures thereof.

(References on following page)

References Cited

UNITED STATES PATENTS

| | | | |
|---|---|---|---|
| 2,956,723 | 10/1960 | Tritsch | 161—252 XR |
| 3,264,272 | 8/1966 | Rees | 260—78.5 |
| 3,340,091 | 9/1967 | Zweig | 161—252 XR |
| 3,391,129 | 7/1968 | Sparks | 161—252 XR |

FOREIGN PATENTS

| | | |
|---|---|---|
| 375,561 | 6/1962 | Japan. |

OTHER REFERENCES

Farkas, Heat Sealing, New York, Reinhold, 1964, pp. 29 and 160.

ROBERT F. BURNETT, Primary Examiner

R. H. CRISS, Assistant Examiner

U.S. Cl. X.R.

156—306; 161—252; 229—48